(12) United States Patent
Lautenbach et al.

(10) Patent No.: US 12,107,430 B2
(45) Date of Patent: Oct. 1, 2024

(54) AC AND DC ELECTRICAL OUTLET

(71) Applicant: Norman R. Byrne, Ada, MI (US)

(72) Inventors: Aaron G. Lautenbach, Rockford, MI (US); Yiqi Wang, Rockford, MI (US)

(73) Assignee: Norman R. Byrne, Ada, MI (US)

( * ) Notice: Subject to any disclaimer, the term of this patent is extended or adjusted under 35 U.S.C. 154(b) by 0 days.

(21) Appl. No.: 17/554,649

(22) Filed: Dec. 17, 2021

(65) Prior Publication Data

US 2022/0200292 A1 Jun. 23, 2022

Related U.S. Application Data

(60) Provisional application No. 63/127,143, filed on Dec. 17, 2020.

(51) Int. Cl.
*H02J 4/00* (2006.01)
*B60R 16/03* (2006.01)
*H01R 27/02* (2006.01)

(52) U.S. Cl.
CPC ............ *H02J 4/00* (2013.01); *B60R 16/03* (2013.01); *H01R 27/02* (2013.01); *H01R 2201/26* (2013.01)

(58) Field of Classification Search
CPC . H02J 4/00; B60R 16/03; H01R 27/02; H01R 2201/26
See application file for complete search history.

(56) References Cited

U.S. PATENT DOCUMENTS

| | | | |
|---|---|---|---|
| 6,856,162 B1 * | 2/2005 | Greatorex | H02S 50/00 324/426 |
| 8,444,432 B2 | 5/2013 | Byrne et al. | |
| 8,480,429 B2 | 7/2013 | Byrne | |
| 9,601,860 B2 | 3/2017 | Byrne et al. | |
| 10,965,049 B2 | 3/2021 | Byrne et al. | |
| 2008/0164850 A1 * | 7/2008 | Ayana | H02J 9/00 322/1 |
| 2010/0076615 A1 * | 3/2010 | Daniel | H02S 50/00 703/2 |
| 2018/0072252 A1 * | 3/2018 | Collins | B60R 16/03 |
| 2018/0126932 A1 * | 5/2018 | Secord | H01R 25/003 |
| 2019/0260210 A1 * | 8/2019 | Peloquin, Jr. | B60K 25/00 |
| 2020/0044480 A1 * | 2/2020 | Kydd | H02J 9/062 |
| 2020/0231081 A1 * | 7/2020 | Coons | B60P 3/00 |
| 2021/0036473 A1 * | 2/2021 | Moore | H02G 3/14 |
| 2022/0371443 A1 * | 11/2022 | Stanfield | B60L 53/16 |

\* cited by examiner

*Primary Examiner* — Daniel Kessie
*Assistant Examiner* — Brian K Baxter
(74) *Attorney, Agent, or Firm* — Gardner, Linn, Burkhart & Ondersma LLP

(57) ABSTRACT

An electrical outlet for a recreational vehicle includes a high voltage AC electrical power receptacle and a low voltage DC electrical power receptacle that is powered independently of the high voltage AC receptacle so that the DC receptacle can remain energized when the AC receptacle is disconnected from an AC power supply. The DC and AC receptacles, located at the same electrical outlet, are wired separately to different power sources. This allows the recreational vehicle's electrical storage batteries to continue energizing the DC receptacle, at the same outlet as the AC receptacle, even when it is not possible or desirable to energize the AC receptacle. Therefore, limited functionality can be maintained at the outlet even when no AC mains, onboard generator, or AC-to-DC inverter is connected or in operation.

10 Claims, 4 Drawing Sheets

AC AND DC ELECTRICAL OUTLET

CROSS REFERENCE TO RELATED APPLICATION

The present invention claims the benefit of U.S. provisional application Ser. No. 63/127,143, filed Dec. 17, 2020, which is hereby incorporated herein by reference in its entirety.

FIELD OF THE INVENTION

The present invention relates to relates to electrical power outlets and, more particularly, to electrical power outlets for use in recreational vehicles.

BACKGROUND OF THE INVENTION

Recreational vehicles such as self-powered camper vehicles and camper trailers, boats with cabins, and the like, are commonly outfitted with electrical receptacles that provide users with access to electrical power. The power provided at such outlets is typically 110V or 220V AC power from an AC mains source outside the vehicle, such as a power hook-up connection at a campsite or a marina slip, or from an onboard battery whose DC voltage output (typically 6V, 12V, or 24V) is converted to 110V or 220V AC power that is supplied to the outlets. The onboard battery may be used to supply a limited amount of electrical power unless it can be recharged using a solar collector, a portable or on-vehicle generator or alternator, or an AC mains source. However, with the proliferation of portable electronic devices including smart phones, e-readers, and tablet computers that require DC power for charging, it may be necessary for users of these devices to carry their own AC-to-DC power converters for charging their devices. This can result in particularly inefficient use of limited available electrical power, when an onboard vehicle battery's low voltage DC output is converted to high voltage AC power at the vehicle's electrical inverter, supplied to the outlet, and converted back to low voltage DC power by the AC-to-DC power converter that must be plugged into the high voltage AC outlet.

SUMMARY OF THE INVENTION

The present invention provides an electrical power outlet with both AC and DC receptacles for use in recreational vehicles, which receptacles can be energized together or separately, depending upon the operating conditions of the vehicle's electrical system. For example, when the vehicle's electrical system is connected to an AC mains power source at a developed campsite or marina slip, the AC receptacle(s) at the power outlet may be energized with high voltage AC power directly from the AC mains power source, while the DC receptacle(s) at the same power outlet may be independently energized from a DC power source, such as the vehicle's onboard battery or an AC-to-DC transformer. When the vehicle is not receiving AC mains power, the AC receptacle(s) may be de-energized to limit or entirely prevent energy loss from operating the vehicle's DC-to-AC inverter while the DC receptacle(s) remain energized directly from the vehicle's onboard battery with no energy loss except to devices receiving DC power from the DC receptacles or other DC-powered equipment onboard. The electrical power outlet with both AC and DC receptacles may be installed in place of existing AC power outlets in a recreational vehicle to provide access to DC power at all times that the vehicle's onboard battery is able to provide it, regardless of whether or not the AC receptacles are energized.

In one form of the present invention, an electrical outlet for a recreational vehicle includes a high voltage AC electrical power receptacle, a low voltage DC electrical power receptacle, high voltage electrical conductors in communication with the high voltage AC electrical receptacle, and low voltage electrical conductors in communication with the low voltage DC electrical receptacle. The high voltage electrical conductors can be selectively energized by one or more AC power sources, such as an AC mains source outside of the vehicle, or an alternator or electrical inverter onboard the vehicle. The low voltage can be selectively energized by a DC power source that is energized independently of the AC power source, such as from an electrical power converter or electrical storage batteries onboard the vehicle. The high voltage AC electrical power receptacle and the low voltage DC electrical power receptacle are simultaneously energizable by the AC power source and the DC power source, respectively. The low voltage DC electrical power receptacle is energizable independently of the high voltage AC electrical power receptacle at least when the high voltage AC electrical power receptacle is de-energized.

In one aspect, an AC-to-DC electrical converter is provided for supplying low voltage DC electrical power to the low voltage DC electrical power receptacle, with additional high voltage AC electrical conductors in electrical communication with the high voltage AC electrical power receptacle and with the AC-to-DC electrical converter in order to power the converter. The low voltage DC electrical power receptacle is energizable by the AC-to-DC electrical converter when the high voltage AC electrical conductors and the additional high voltage AC electrical conductors are electrically energized.

Therefore, the present invention provides substantially continuous access to at least low voltage DC electrical power in an electrical system of a recreational vehicle that is equipped with both high voltage AC electrical power and low voltage DC power, even when AC electrical power is not available. The DC power can be supplied in an energy-efficient manner without losses due to AC-to-DC power conversion and/or DC-to-AC power conversion, which may be particularly useful when a recreational vehicle is used "off grid" without access to a continuous supply of AC electrical power.

These and other objects, advantages, purposes and features of the present invention will become apparent upon review of the following specification in conjunction with the drawings.

DETAILED DESCRIPTION OF PREFERRED EMBODIMENTS

Figure 1:
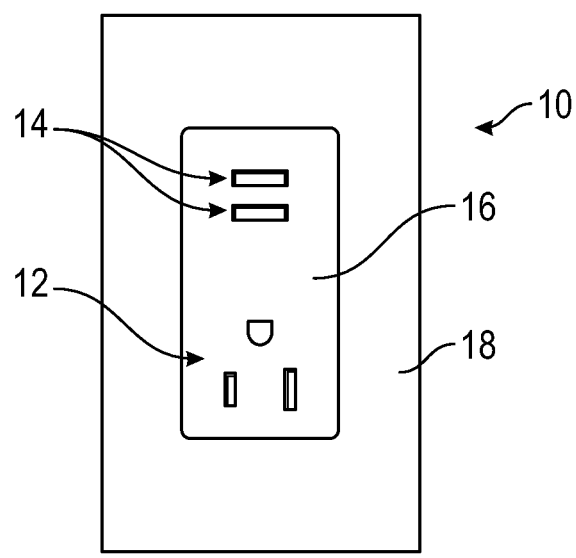
FIG. 1 is a front elevation of an AC and DC electrical outlet in accordance with the present invention.
Figure 5:
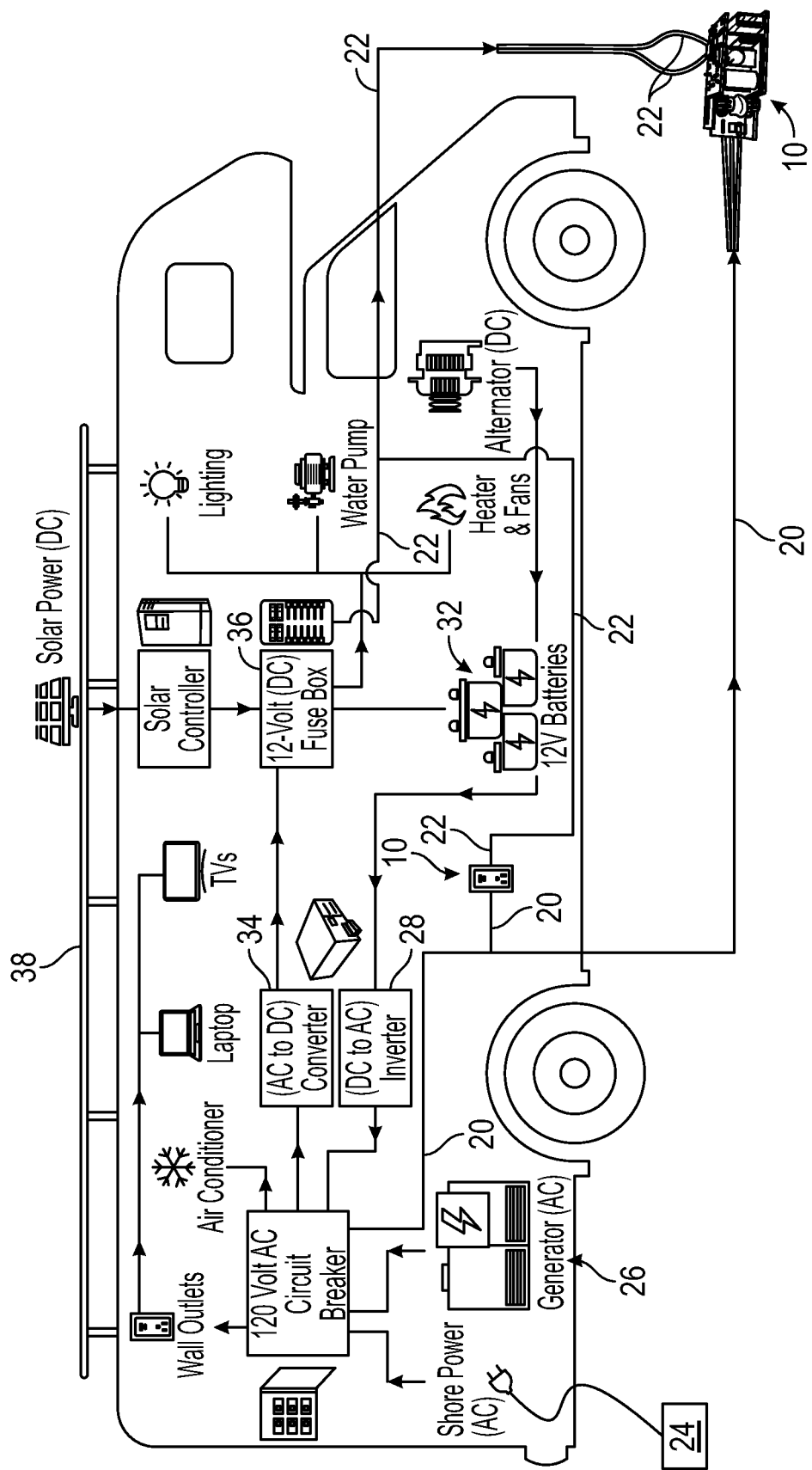
FIG. 5 is an electrical diagram of a recreational vehicle incorporating the AC and DC electrical outlet.

Referring now to the drawings and the illustrative embodiments depicted therein, an electrical power outlet 10 includes a high voltage AC simplex receptacle 12 and a pair of low voltage DC receptacles 14, such as shown in FIG. 1. The AC receptacle 12 and DC receptacles 14 are accessible via respective openings formed in a face plate 16, which in turn is surrounded by a decorative bezel plate 18 that obscures an opening formed in a wall, ceiling, or other surface of a recreational vehicle's interior (FIG. 5). An electrical outlet box (not shown) would typically be mounted in the opening, for containing and isolating electrical components of the electrical power outlet 10.

Figure 2:
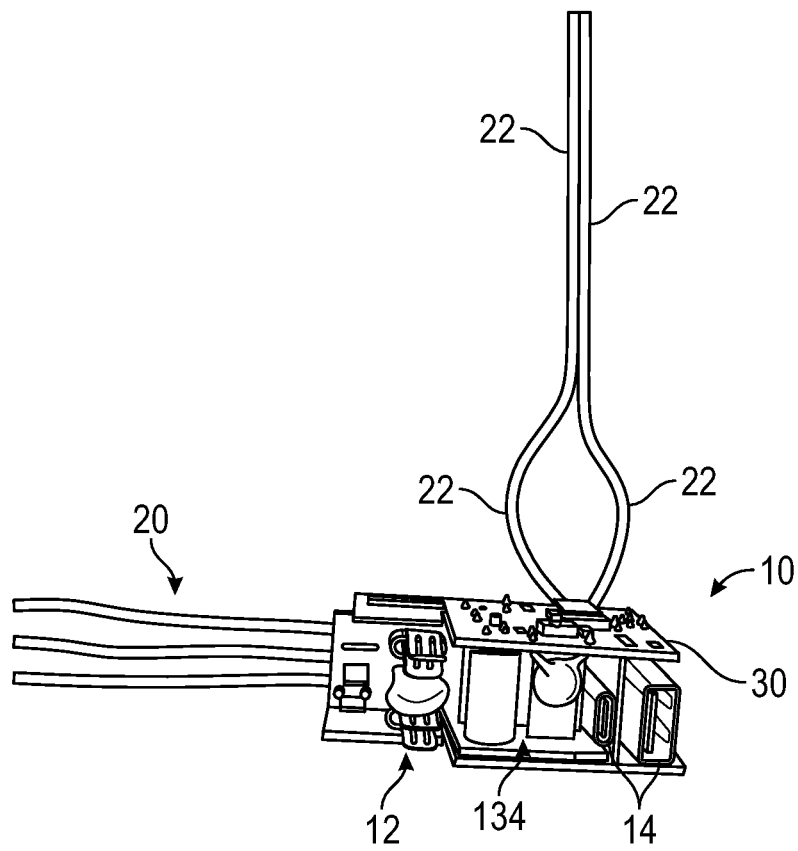
FIG. 2 is a side perspective view of the AC and DC electrical outlet of FIG. 1, with face plate, bezel, and housing removed to show internal structure.
Figure 3C:
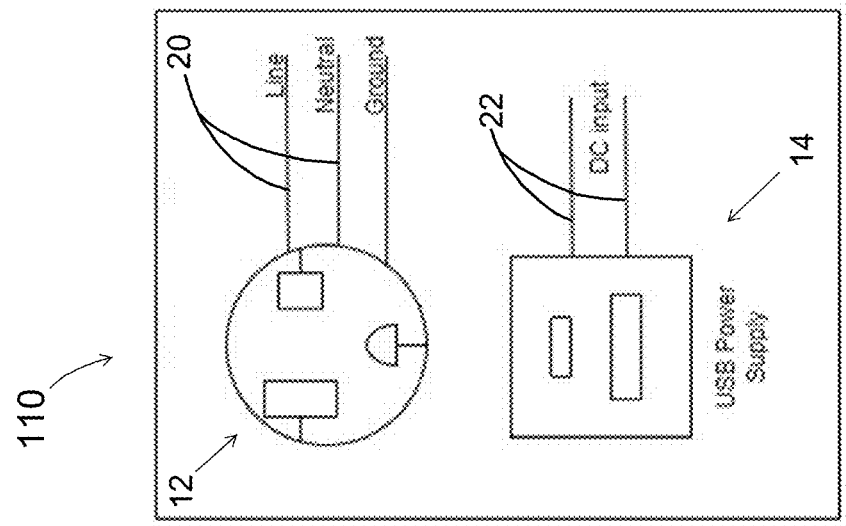
FIG. 3C is a diagrammatic view of an alternative AC and DC electrical outlet in accordance with the present invention.
Figure 3B:
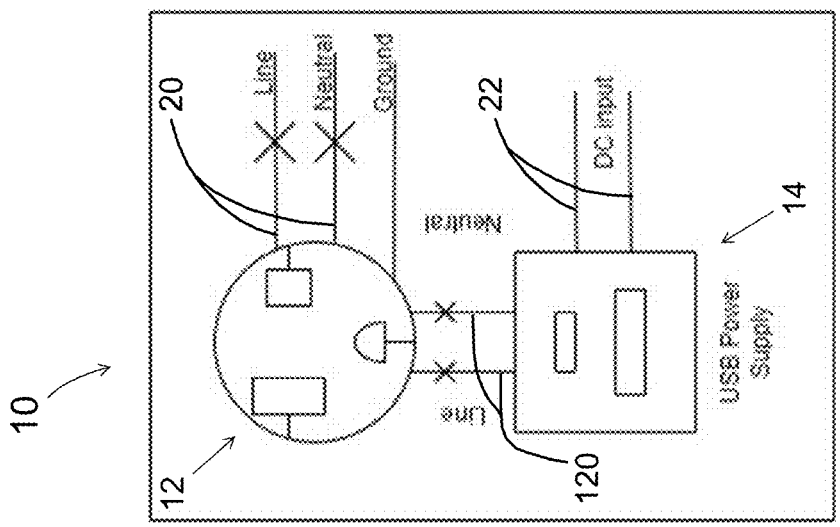
FIGS. 3A and 3B are diagrammatic views of the AC and DC electrical outlet of FIG. 1, in which X's placed over electrical conductors indicate the conductors are not energized, to indicate different modes of operation.
Figure 3A:
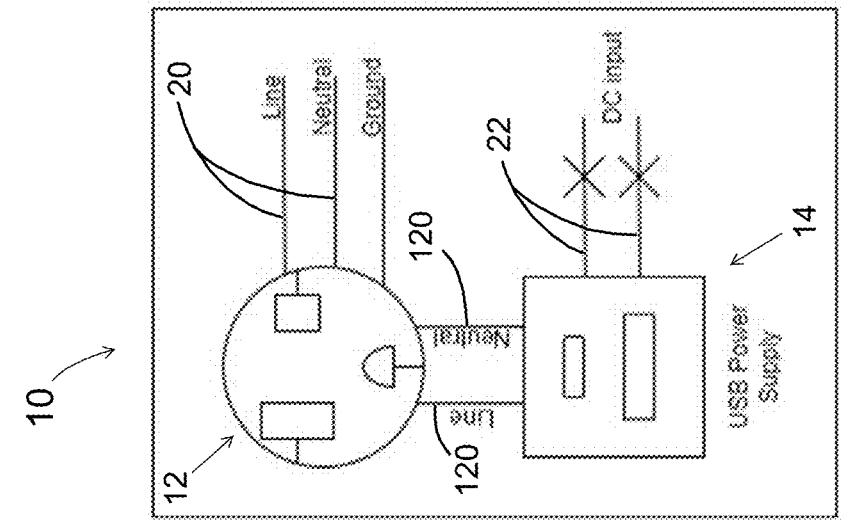
Figure 4:
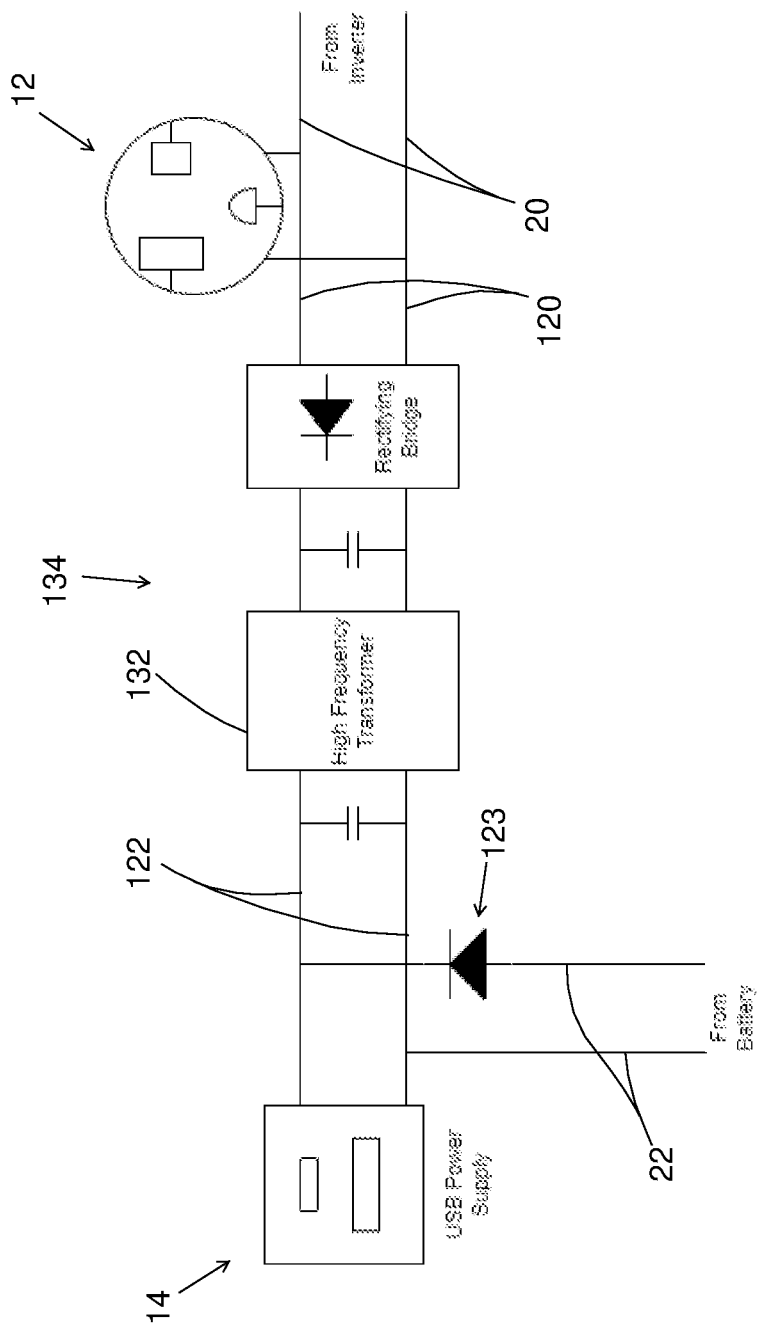
FIG. 4 is a simplified circuit diagram of the electrical outlet of FIG. 1.

The AC receptacle 12 is electrically energizable by a set of high voltage AC wires 20, while the DC receptacle 14 is electrically energizable by a set of low voltage DC wires 22, which are independent of the high voltage AC wires 20 (FIGS. 2-5). The AC wires 20 connect to respective AC terminals behind the AC contacts of the AC receptacle 12, and the DC wires 22 connect to respective DC terminals behind the DC contacts of the DC receptacles 14. The separate wires 20, 22 and their respective power sources allow at least low voltage DC electrical power to be maintained at the DC receptacles 14 of the outlet 10, even when the AC receptacle 12 is de-energized such as when an electrical mains source 24 (FIG. 5) is disconnected, when an onboard electrical generator 26 is shut off, and when a DC-to-AC inverter 28 is shut off. However, as shown in FIGS. 3A, 3B, and 4, there is an additional set of high voltage AC wires 120 extending from AC receptacle 12 to an AC-to-DC converter 134 (FIGS. 2 and 4). The AC-to-DC converter 134 is associated with the DC receptacles 14, such that DC receptacles 14 can be electrically energized, via AC-to-DC converter 134, by the AC power supplied to AC receptacle 12, even if the DC wires 22 are not energized, as shown in FIG. 3A. When AC wires 20, 120 are not energized, as shown in FIG. 3B, DC receptacles 14 can still be energized by DC wires 22.

Optionally, switches or diodes are incorporated into the circuitry associated with DC receptacles 14 so that DC power can be supplied from either DC wires 22, or from the additional high voltage AC wires 120 via AC-to-DC converter 134, but not from both sources simultaneously. For example, and with reference to FIG. 3A, if AC electrical power is being supplied along additional high voltage AC wires 120, circuitry associated with DC receptacles 14 may disconnect from DC wires 22 so that the only supply of DC power to DC receptacles 14 originates from AC wires 20 and additional AC wires 120.

Referring to FIG. 4, the DC receptacles 14 are designed to operate from a wide range of input voltages, such as using step-down circuitry 30 described below. A high frequency transformer 132 of AC-to-DC converter 134 is designed to output a higher voltage (higher by about 1V, for example) than the highest possible battery voltage that could be present along DC input wires 22 in the particular vehicle application. When the vehicle's AC inverter or outside AC power source is supplying high voltage AC power along AC supply wires 20, transformer 132 supplies the DC power to the additional high voltage AC wires 120 and DC receptacles 14 via a DC link capacitor. When the vehicle's AC inverter or outside AC power source is not supplying high voltage AC power along AC supply wires 20, In the embodiment of FIG. 3C, a simplified electrical power outlet 110 is substantially similar to the outlet 10 described above, but omits the additional set of high voltage AC wires 120 and the AC-to-DC converter 134 found in outlet 10, and therefore the simplified outlet's DC wires 22 are the only available supply of DC electrical power to the simplified outlet's DC receptacles 14. While simplified outlet 110 is somewhat less versatile than the outlet 10 in that the simplified outlet's DC receptacles 14 cannot be powered from AC power on the AC supply wires 20, simplified outlet 110 is lower in cost to produce, less complex, and typically lower in weight due to the AC-to-DC converter circuitry and associated conductors or wiring that is omitted.

Referring to FIGS. 2, 3B, 4, and 5, DC receptacles 14 receive DC power from a pair of the low voltage DC wires 22, one of which provides positive polarity while the other provides negative polarity. Optionally, DC-to-DC voltage step-down circuitry 30 (FIG. 2) is provided at the outlet 10 to reduce the incoming DC voltage (typically 12V DC, but potentially 14V DC or higher such as when a recreational vehicle's batteries are being recharged) to a lower voltage for the DC receptacles 14, such as 5V DC. The DC electrical power may be provided by onboard electrical storage batteries 32, by an onboard AC-to-DC converter 34, by the additional AC wires 120 to the AC-to-DC converter 134 as described above, or by a solar array 38, such as shown in FIGS. 4 and 5. The recreational vehicle's electrical system may include automatic switches for selectively directing DC power to the DC receptacles 14 from available DC power sources such as the batteries 32 and AC-to-DC converter 34, and similarly may include automatic switches for selectively directing AC power to the AC receptacles 12 from available AC power sources such as the mains source 24, the generator 26, and the DC-to-AC inverter 28. Typically, a 12-Volt (DC) fuse box 36 (FIG. 5) handles the power management between the AC-to-DC converter 34, batteries 32, the solar array 38, and AC mains 24. In some cases the AC-to-DC converter and the 12V fuse box may be combined into a single unit. All power infeeds route through the electrical fuse box or unit and it seamlessly provides power to the system's protected circuits.

AC receptacle 12 is illustrated as a NEMA 110V AC receptacle, although it will be appreciated that substantially any high voltage AC receptacle may be used for the market to which the recreational vehicle is directed. Similarly, as shown in FIG. 2 the low voltage DC receptacles 14 include a USB-A receptacle (at right in FIG. 2) and a USB-C receptacle (at left in FIG. 2). It will be appreciated that substantially any low voltage DC receptacle may be substituted for these. Optionally, the electrical power outlet 10 may be part of a modular electrical system that includes multiple outlets 10 receiving power in a series or daisy-chain fashion, so that the low voltage receptacles 14 of multiple outlets 10 can be maintained in an energized state while the high voltage AC receptacles 12 are de-energized.

The electrical outlets of the present invention may be incorporated into substantially any recreational vehicle having one or more electrical outlets for the convenience of passengers or occupants. Such vehicles may include marine vessels such as power boats and sailboats, self-powered camper trucks, truck campers, towed camper trailers, and the like. The electrical outlets may be retrofitted into the place of an existing AC-only outlet, with the vehicle's existing AC wires connected to the AC terminals of the outlet 10, 110 and with added DC electrical wires routed from the existing outlet opening to the DC fuse box or switching box. The electrical outlets 10, 110 provide constant access to DC electrical power from any available DC power source, without requiring unsightly plug-in electrical converters. The recreational vehicle may be disconnected from sources of AC electrical power for extended periods while maintaining a constant supply of DC power at the same outlets 10, 110 that can supply AC power when connected to AC mains, or when an onboard generator or voltage inverter are operated.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. An electrical outlet for a recreational vehicle (RV), said electrical outlet comprising:
    a high voltage AC electrical power receptacle;
    high voltage electrical conductors in communication with said high voltage AC electrical receptacle, said high voltage electrical conductors configured to be selectively energized by (i) an external AC power source that is independent of the RV, and (ii) an internal AC power source that is onboard the RV;
    a low voltage DC electrical power receptacle;
    low voltage electrical conductors in communication with said low voltage DC electrical receptacle, said low voltage electrical conductors configured to be selectively energized directly by a DC power source that is onboard the RV and energized independently of the AC power sources;
    an AC-to-DC electrical converter adapted to supply low voltage DC electrical power to said low voltage DC electrical power receptacle;
    additional high voltage AC electrical conductors in electrical communication with said high voltage AC electrical power receptacle and with said AC-to-DC electrical converter; and
    additional low voltage DC electrical conductors in electrical communication with said low voltage DC electrical power receptacle and with said AC-to-DC electrical converter;
    wherein said high voltage AC electrical power receptacle is energizable by one of the AC power sources and said low voltage DC electrical power receptacle is energizable by the DC power source;
    wherein said low voltage DC electrical power receptacle is energizable independently of said high voltage AC electrical power receptacle, and directly from the DC power source when said high voltage AC electrical power receptacle is de-energized; and
    wherein said low voltage DC electrical power receptacle is energizable by said AC-to-DC electrical converter when said high voltage AC electrical conductors and said additional high voltage AC electrical conductors are electrically energized.

2. The electrical outlet of claim 1, wherein said high voltage AC electrical power receptacle comprises a NEMA 110V AC receptacle.

3. The electrical outlet of claim 1, wherein said low voltage DC electrical power receptacle comprises a USB-type receptacle.

4. The electrical outlet of claim 1, further comprising AC electrical wiring establishing electrical continuity from said high voltage electrical conductors to an AC circuit breaker on the recreational vehicle, wherein the AC circuit breaker selectively receives high voltage electrical power from each of (i) an AC mains power source independent of the recreational vehicle, (ii) an alternator-type electrical generator on the recreational vehicle, and (iii) a DC-to-AC inverter on the recreational vehicle and electrically coupled to an electrical battery on the vehicle.

5. The electrical outlet of claim 4, further comprising DC electrical wiring establishing electrical continuity from said low voltage electrical conductors directly to the DC power source that is onboard the RV comprising an electrical storage battery.

6. The electrical outlet of claim 1, wherein said low voltage DC electrical power receptacle is energizable by either of (i) said additional high voltage AC electrical conductors via said AC-to-DC electrical converter and said additional low voltage DC electrical conductors, or (ii) the DC power source via said low voltage electrical conductors, and wherein said low voltage DC electrical power receptacle is not simultaneously energizable by both said additional high voltage AC electrical conductors and said low voltage electrical conductors.

7. An electrical outlet for a recreational vehicle, said electrical outlet comprising:
    a high voltage AC electrical power receptacle;
    high voltage electrical conductors in communication with said high voltage AC electrical receptacle, said high voltage electrical conductors configured to be selectively energized by (i) an external AC power source that is independent of the RV, and (ii) an internal AC power source that is onboard the RV;
    a low voltage DC electrical power receptacle;
    an AC-to-DC electrical converter adapted to receive high voltage AC power from said high voltage electrical conductors, and to selectively supply low voltage DC electrical power to said low voltage DC electrical power receptacle when said high voltage electrical conductors are energized;
    first low voltage DC electrical conductors in electrical communication with said low voltage DC electrical power receptacle and with said AC-to-DC electrical converter; and
    second low voltage electrical conductors in communication with said low voltage DC electrical receptacle, said low voltage electrical conductors configured to be selectively energized by a DC power source that is onboard the RV and external to said electrical outlet and energized independently of the AC power sources;
    wherein said low voltage DC electrical power receptacle is energizable by either of said AC-to-DC electrical converter via said first low voltage DC electrical conductors, or directly by the DC power source via said second low voltage electrical conductors; and
    wherein said low voltage DC electrical power receptacle is energizable independently of said high voltage AC electrical power receptacle, and directly from the DC power source that is onboard the RV and external to said electrical outlet, when said high voltage AC electrical power receptacle is de-energized.

8. The electrical outlet of claim 7, further comprising:
    additional high voltage AC electrical conductors in electrical communication with said high voltage AC electrical power receptacle and with said AC-to-DC electrical converter;

wherein said low voltage DC electrical power receptacle is energizable by said AC-to-DC electrical converter when said high voltage AC electrical conductors and said additional high voltage AC electrical conductors are electrically energized.

9. The electrical outlet of claim 8, further comprising a diode disposed along one of said second low voltage electrical conductors, said diode configured so that said low voltage DC electrical power receptacle is not simultaneously energizable by both said additional high voltage AC electrical conductors and said low voltage electrical conductors.

10. The electrical outlet of claim 8, wherein said AC to DC converter comprises a high frequency transformer that is operable to output a DC voltage that is higher than a DC voltage of the DC power source.

* * * * *

UNITED STATES PATENT AND TRADEMARK OFFICE
CERTIFICATE OF CORRECTION

PATENT NO. : 12,107,430 B2
APPLICATION NO. : 17/554649
DATED : October 1, 2024
INVENTOR(S) : Aaron G. Lautenbach and Yiqi Wang It is certified that error appears in the above-identified patent and that said Letters Patent is hereby corrected as shown below:

In the Specification

The paragraph starting at Column 3, Line 57 and ending at Column 4, Line 3 currently reads:
Referring to FIG. 4, the DC receptacles 14 are designed to operate from a wide range of input voltages, such as using step-down circuitry 30 described below. A high frequency transformer 132 of AC-to-DC converter 134 is designed to output a higher voltage (higher by about 1V, for example) than the highest possible battery voltage that could be present along DC input wires 22 in the particular vehicle application. When the vehicle's AC inverter or outside AC power source is supplying high voltage AC power along AC supply wires 20, transformer 132 supplies the DC power to the additional high voltage AC wires 120 and DC receptacles 14 via a DC link capacitor. When the vehicle's AC inverter or outside AC power source is not supplying high voltage AC power along AC supply wires 20, But should be:
Referring to FIG. 4, the DC receptacles 14 are designed to operate from a wide range of input voltages, such as using step-down circuitry 30 described below. A high frequency transformer 132 of AC-to-DC converter 134 is designed to output a higher DC voltage (higher by about 1V, for example) than the highest possible DC battery voltage that could be present along DC input wires 22 in the particular vehicle application. When the vehicle's AC inverter or outside AC power source is supplying high voltage AC power along AC supply wires 20, transformer 132 receives the AC power from the additional high voltage AC wires 120 and supplies DC power to the DC receptacles 14 via a DC link capacitor and additional DC wires 122, during which a diode 123 along DC wires 22 blocks current flow toward the batteries 32. When the vehicle's AC inverter or outside AC power source is not supplying high voltage AC power along AC supply wires 20, 120, transformer 132 is de-energized such that diode 123 permits DC power to be supplied directly to DC receptacles 14 by batteries 12. In this way, the low voltage DC electrical receptacles 14 are not energizable by the additional high voltage AC supply wires 120 and additional DC wires 122, at the same time the DC receptacles 14 are energized by the DC supply wires 22, and vice versa.

Signed and Sealed this
Twenty-ninth Day of October, 2024

Katherine Kelly Vidal
*Director of the United States Patent and Trademark Office*